US009253261B2

(12) United States Patent
Weissblum (10) Patent No.: US 9,253,261 B2
(45) Date of Patent: Feb. 2, 2016

(54) SYSTEM AND METHOD FOR MAIN PAGE IDENTIFICATION IN WEB DECODING

(75) Inventor: Ofer Weissblum, Tel Aviv (IL)

(73) Assignee: VERINT SYSTEMS LTD., Herzella, Pituach (IL)

( * ) Notice: Subject to any disclaimer, the term of this patent is extended or adjusted under 35 U.S.C. 154(b) by 604 days.

(21) Appl. No.: 13/557,359

(22) Filed: Jul. 25, 2012

(65) Prior Publication Data

US 2013/0198391 A1 Aug. 1, 2013

(30) Foreign Application Priority Data

Jul. 31, 2011 (IL) .......................................... 214360

(51) Int. Cl.
*G06F 15/16* (2006.01)
*H04L 29/08* (2006.01)
*H04L 29/06* (2006.01)

(52) U.S. Cl.
CPC .............. *H04L 67/14* (2013.01); *H04L 63/306* (2013.01)

(58) Field of Classification Search
CPC . H04L 63/1416; H04L 43/18; H04L 63/1425; H04L 29/06884; H04L 67/14
USPC ......................................................... 709/227
See application file for complete search history.

(56) References Cited

U.S. PATENT DOCUMENTS

| | | | |
|---|---|---|---|
| 5,689,442 A | 11/1997 | Swanson et al. | |
| 6,404,857 B1 | 6/2002 | Blair et al. | |
| 6,718,023 B1 | 4/2004 | Zolotov | |
| 6,757,361 B2 | 6/2004 | Blair et al. | |
| 7,216,162 B2 | 5/2007 | Amit et al. | |
| 7,466,816 B2 | 12/2008 | Blair | |
| RE40,634 E | 2/2009 | Blair et al. | |
| 7,587,041 B2 | 9/2009 | Blair | |
| 8,347,225 B2* | 1/2013 | Blinnikka et al. | ............ 715/787 |
| 2003/0028662 A1* | 2/2003 | Rowley et al. | ................ 709/231 |
| 2004/0100507 A1* | 5/2004 | Hayner | ................... H04L 67/22 715/855 |
| 2008/0014873 A1 | 1/2008 | Krayer et al. | |

(Continued)

OTHER PUBLICATIONS

Liu, Rong-Tai, et al., "A Fast Pattern-Match Engine for Network Processor-based NIDS," Proceedings of the 20th International Conference on Information Technology (ITCC'04), Dec. 5, 2006, 23 pages.

(Continued)

*Primary Examiner* — Douglas Blair
*Assistant Examiner* — Imran Moorad
(74) *Attorney, Agent, or Firm* — Meunier Carlin & Curfman (57) ABSTRACT

Web pages may be rendered from a main page data element and a plurality of embedded data elements, which are separately fetched by a browser. Herein is provided a web decoder which includes a learning engine adapted to receive human indications of data elements which are unimportant and accordingly to adjust the web decoder's procedures for determining which data elements are displayed to the user. The learning engine may receive human indications of important data elements and uses both types of indications in its further determinations. Optionally, rule generalizations are performed in a manner which searches for parameters which differentiate between important and unimportant data elements. The rule generalizations optionally concentrate on groups of data elements having at least a predetermined number of parameters having the same values for both important and unimportant data elements, reducing the chances that a generalization rule will find important data elements as unimportant.

2 Claims, 3 Drawing Sheets

(56) References Cited

U.S. PATENT DOCUMENTS

| | | | |
|---|---|---|---|
| 2008/0261192 A1 | 10/2008 | Huang et al. | |
| 2008/0285464 A1 | 11/2008 | Katzir | |
| 2009/0113036 A1* | 4/2009 | Zampiello | 709/224 |
| 2011/0055627 A1* | 3/2011 | Zawacki et al. | 714/15 |
| 2011/0238723 A1* | 9/2011 | Weintraub et al. | 709/201 |

OTHER PUBLICATIONS

Rohde & Schwarz GmbH & Co. KG, "ACCESSNET-T, DMX-500 R2, Digital Mobile eXchange," Product Brochure, Secure Communications, Mar. 2000, 4 pages.

Rohde & Schwarz GmbH & Co. KG, "ACCESSNET-T IP," Product Brochure, Secure Communications, Jan. 2000, 4 pages.

Rohde & Schwarz GmbH & Co. KG, "R&S AllAudio Integrierte digitale Audio-Software," Product Brochure, Feb. 2002, 12 pages.

Rohde & Schwarz GmbH & Co. KG, "R&S AllAudio Integrated Digital Audio Software," Product Brochure, Radiomonitoring & Radiolocation, Feb. 2000, 12 pages.

Rohde & Schwarz GmbH & Co. KG, "The R&S AMMOS GX430 PC-Based Signal Analysis and Signal Processing Standalone software solution," http://www2.rohde-schwarz.com/en/products/radiomonitoring/Signal$_{13}$ Analysis/GX430, Jul. 30, 2010, 1 page.

Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.

Rohde & Schwarz GmbH & Co. KG, "R&S RAMON COMINT/CESM Software," Product Brochure, Radiomonitoring & Radiolocation, Jan. 2000, 22 pages.

Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.

Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.

Rohde & Schwarz GmbH & Co. KG, "R&S RA-CM Continuous Monitoring Software," Product Brochure, Radiomonitoring & Radiolocation, Jan. 2001, 16 pages.

Rohde & Schwarz GmbH & Co. KG, "Integrated Digital Audio Software R&S AllAudio," Specifications, 8 pages.

Metronome SSL Inspector Solution Overview White Paper, "Examining SSL-encrypted Communications," 2010, 8 pages.

Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.

Fisk, Mike, et al., "Applying Fast String Matching to Intrusion Detection," Los Alamos National Laboratory and University of California San Diego, 22 pages.

Fox Replay BV, "FoxReplay Analyst," http//www.foxreplay.com, Revision 1.0, Nov. 2007, 5 pages.

Fox-IT BV, "FoxReplay Analyst," Product Brochure, http//www.foxreplay.com, 2 pages.

Aho, Alfred V., et al., "Efficient String Matching: An Aid to Bibliographic Search," Communication of the ACM, Jun. 1975, vol. 18, No. 6, pp. 333-340.

Coffman, T., et al., "Graph-Based Technologies for Intelligence Analysis," CACM, Mar. 2004, 12 pages.

Cloudshield, Inc., "Lawful Intercept Next-Generation Platform," 2009, 6 pages.

Goldfarb, Eithan, "Mass Link Analysis: Conceptual Analysis," 2006, Version 1.1, 21 pages.

Verint Systems Inc., "Mass Link Analysis: Solution Description," Dec. 2008, 16 pages.

High-Performance LI with Deep Packet Inspection on Commodity Hardware, ISS World, Singapore, Jun. 9-11, 2008, Presenter: Klaus Mochalski, CEO, ipoque, 25 pages.

Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.

Schulzrinne, H., et al., "RTP: A Transport Protocol for Real-Time Applications," Standards Track, Jul. 2003, 89 pages.

Sheng, Lei, "A Graph Query Language and Its Query Processing," IEEE, Apr. 1999, pp. 572-581.

Soghoian, Christopher, et al., "Certified Lies: Detecting and Defeating Government Interception Attacks Against SSL," 19 pages.

Svenson, Pontus, "Social network analysis and information fusion for anti-terrorism," CIMI, 2006, 8 pages.

Tongaonkar, Alok S., "Fast Pattern-Matching Techniquest for Packet Filtering," Stony Brook University, May 2004, 44 pages.

Yu, Fang, et al., "Fast and Memory-Efficient Regular Expression Matching for Deep Packet Inspection," ANCS'06, Dec. 3-5, 2006, San Jose, California, 10 pages.

Yu, Fang, et al., "Gigabit Rate Packet Pattern-Matching Usint TCAM," Proceedings of the 12th IEEE International Conference on Network Protocols (ICNP'04) 10 pages.

Extended European Search Report, dated Nov. 20, 2012, received from the European Patent Office in connection with European Application No. 12177977.1.

Cohen, M.I., "PyFlag—An advanced network forensic framework," Elsevier, Amsterdam, NL, vol. 5, No. 1, Sep. 1, 2008, pp. S112-S120.

"Lawful Interception (LI); Handover Interface and Service-Specific Details (SSD) for IP delivery; Part 5: Service-specific details for IP Multimedia Services," Technical Specification, European Telecommunications Standards Institute (ETSI), vol. LI, No. V2.5.1, Oct. 1, 2010, 24 pages.

* cited by examiner

SYSTEM AND METHOD FOR MAIN PAGE IDENTIFICATION IN WEB DECODING

FIELD OF THE DISCLOSURE

The present disclosure relates generally to network communication analysis, and particularly to methods and systems for reconstructing web sessions of target users.

BACKGROUND OF THE DISCLOSURE

Some network communication analysis applications analyze network traffic in order to reconstruct network sessions conducted by certain network users. Such analysis may be performed for various reasons, such as network forensics, employee training, data leakage prevention (DLP) and tool testing. For example, Fox-IT (Delft, The Netherlands) offer a system called FoxReplay Analyst, which reconstructs Internet sessions of target users from intercepted Internet packets. The system is described in a white paper entitled "FoxReplay Analyst," Revision 1.0, November, 2007, which is incorporated herein by reference.

SUMMARY OF THE DISCLOSURE

An embodiment that is described herein provides a method for communication analysis, including accepting communication packets exchanged over a network during at least one network session associated with a target user, processing the packets so as to identify data elements viewed by the target user during the network session, displaying identified data elements to an operator, as web pages, receiving feedback from the operator as to which displayed data elements are important, and determining which ones of identified data elements processed from packets accepted after receiving the feedback are to be displayed to the operator, responsive to the received feedback.

Optionally, displaying the identified data elements comprises displaying at least some of the data elements without a request for feedback and at least some of the data elements with a request for feedback.

Optionally, displaying identified data elements comprises displaying data elements identified as a main page without a request for feedback and displaying data elements identified as possibly being a main page with a request for feedback. Optionally, displaying identified data elements comprises displaying some of the identified data elements and not displaying at least one of the data elements identified with high confidence as not being a main page. Optionally, data elements identified with high confidence as not being a main page comprise data elements identified as being downloaded by the target user for display on its own, not embedded in a different page.

Optionally, determining which ones of the identified data elements are to be displayed to the operator comprises determining using an artificial intelligence engine. Optionally, the received feedback used in the determination comprises indications of unimportant elements.

Optionally, determining which ones of the identified data elements are to be displayed to the operator comprises determining for a plurality of data elements having equivalent values of at least one parameter, for which at least some of the elements were indicated as important and at least some were indicated as unimportant, one or more parameters to be used in differentiating between important and unimportant data elements.

Optionally, the plurality of data elements having equivalent values comprise data elements from the same web address. Optionally, determining which ones of the identified data elements are to be displayed to the operator comprises determining for identified data elements belonging to the same session as at least one of the elements for which the received feedback was used in the determination.

Optionally, determining which ones of identified data elements are to be displayed to the operator comprises determining for identified data elements processed from packets accepted after receiving the feedback.

There is further provided in accordance with an embodiment, a communication analyzer, comprising a network interface configured to receive packets exchanged over a network during at least one network session associated with a target user; a display screen; a processor configured to identify data elements viewed by the target user during the network session, to display identified data elements on the screen, as web pages, to receive feedback from the operator as to which displayed data elements are important and to adjust its configuration for identifying data elements, responsive to the received feedback.

Optionally, the processor is configured to request feedback for some of the displayed web pages and not request feedback for others of the displayed web pages.

Optionally, the processor is configured to determine parameter values common to web pages indicated in the feedback as important and parameter values common to web pages indicated in the feedback as unimportant and to adjust its configuration for identifying data elements to identify data elements having those parameter values.

Optionally, the elements considered unimportant comprise elements not identified as a main page. Optionally, the elements considered important are elements including links to a plurality of embedded elements and not being embedded in other elements.

There is further provided in accordance with an embodiment, a method for communication analysis, comprising accepting communication packets exchanged over a network during at least one network session associated with a target user; processing the packets so as to identify data elements viewed by the target user during the network session; determining for a specific identified data element, URLs of a plurality of data elements requested by the specific data element for embedding therein; matching the URLs of the requested data elements to respective identified data elements, at least some of the matches performed although the URLs are not identical; and determining the further handling of the matched identified element responsive to the matching.

Optionally, determining the URLs of embedded elements of the specific data element comprises providing the data element to a browser and collecting the requests generated by the browser, responsive to the specific data element.

Optionally, matching the URLs of the requested data elements to respective identified data elements comprises finding for each requested data element an identified data element having a most similar URL within a respective time window. Optionally, matching the URLs of the requested data elements to respective identified data elements comprises determining whether the difference between the URLs of the requested data element and the most similar identified data element follow a known difference trend. Optionally, determining the further handling of the matched identified element comprises using different rules to determine whether to embed the matched identified element in a different data element and whether to display the matched identified element on its own.

The present disclosure will be more fully understood from the following detailed description of the embodiments thereof, taken together with the drawings in which:

DETAILED DESCRIPTION OF EMBODIMENTS

Overview

Many web pages are rendered from a main page data element and a plurality of embedded data elements (e.g., images, ads, icons, frames), which are fetched separately by the browser performing the rendering. In simple cases, the main page element lists the exact addresses of the embedded files. In more complex situations, complex scripts, depending on various parameters, such as user input, time and random variables, are used to determine the addresses of the embedded files.

In the simple cases, web decoders can identify the embedded elements by their addresses and reconstruct the main page with its embedded elements. The user of the web decoder is then provided with a single web page representing many files, which do not need to be manually viewed separately. In the complex cases, it is not easy to find the links between files.

Finding the embedded elements is required not only to allow their inclusion in their respective main page, but also to avoid interpreting them as main pages and separately displaying them to a user of the web decoder. As each main web page may include dozens of embedded elements, displaying separately even half of the embedded data elements to the user of the web decoder will flood the user with unnecessary information.

Still, in most analysis tools based on web decoding, it is generally more important to avoid false negatives, which are cases in which a significant web page is not displayed, than to avoid false positives, which are cases in which unimportant information is displayed.

An aspect of some embodiments of the disclosure relates to a web decoder which includes a learning engine adapted to receive human indications of data elements which are unimportant and accordingly to adjust the web decoder's procedures for determining which data elements are displayed to the user.

Optionally, the adjusted procedures take effect in real time. In some embodiments of the disclosure, the adjusted procedures take effect within a single session, such that indications on data elements of a specific session of a specific target user are used later in the session to avoid displaying other data elements of the same specific session and target user. In some embodiments of the disclosure, the adjusted procedures take effect without user intervention.

The learning engine may use an artificial intelligence engine, such as a decision tree, a linear regression, a genetic algorithm and/or a neural network, may perform rule generalization and/or may use any other suitable method. In some embodiments, in addition to receiving human indications of unimportant data elements, the learning engine receives human indications of important data elements and uses both types of indications in its further determinations. Optionally, rule generalizations are performed in a manner which searches for parameters which differentiate between important and unimportant data elements. The rule generalizations optionally concentrate on groups of data elements having at least a predetermined number of parameters having the same values for both important and unimportant data elements, reducing the chances that a generalization rule will find important data elements as unimportant.

An aspect of some embodiments of the present disclosure relates to a web decoder which determines which data elements are to be displayed to the operator, at least partially based on the relative time of arrival of the data element, as compared to related data elements. Optionally, the time of arrival is determined relative to other data elements from the same web domain. The time of arrival is indicative of the chances that the data element was retrieved as an embedded element for a different data element or was retrieved as a main web page. Optionally, the time of arrival is used together with other parameters in the determination.

An aspect of some embodiments of the present disclosure relates to a web decoder which intercepts data elements and determines for web page data elements the URLs of data elements embedded in the web page. The web decoder matches the URLs of the data elements with URLs of intercepted data elements, in a manner which allows matching even if the URLs are not identical.

In some embodiments of the disclosure, the web decoder determines rules on differences between requested URLs and corresponding URLs of intercepted data elements. A URL of an intercepted data element is considered as matching a requested URL, if the difference between them matches one of the determined rules.

System Overview

Figure 1:
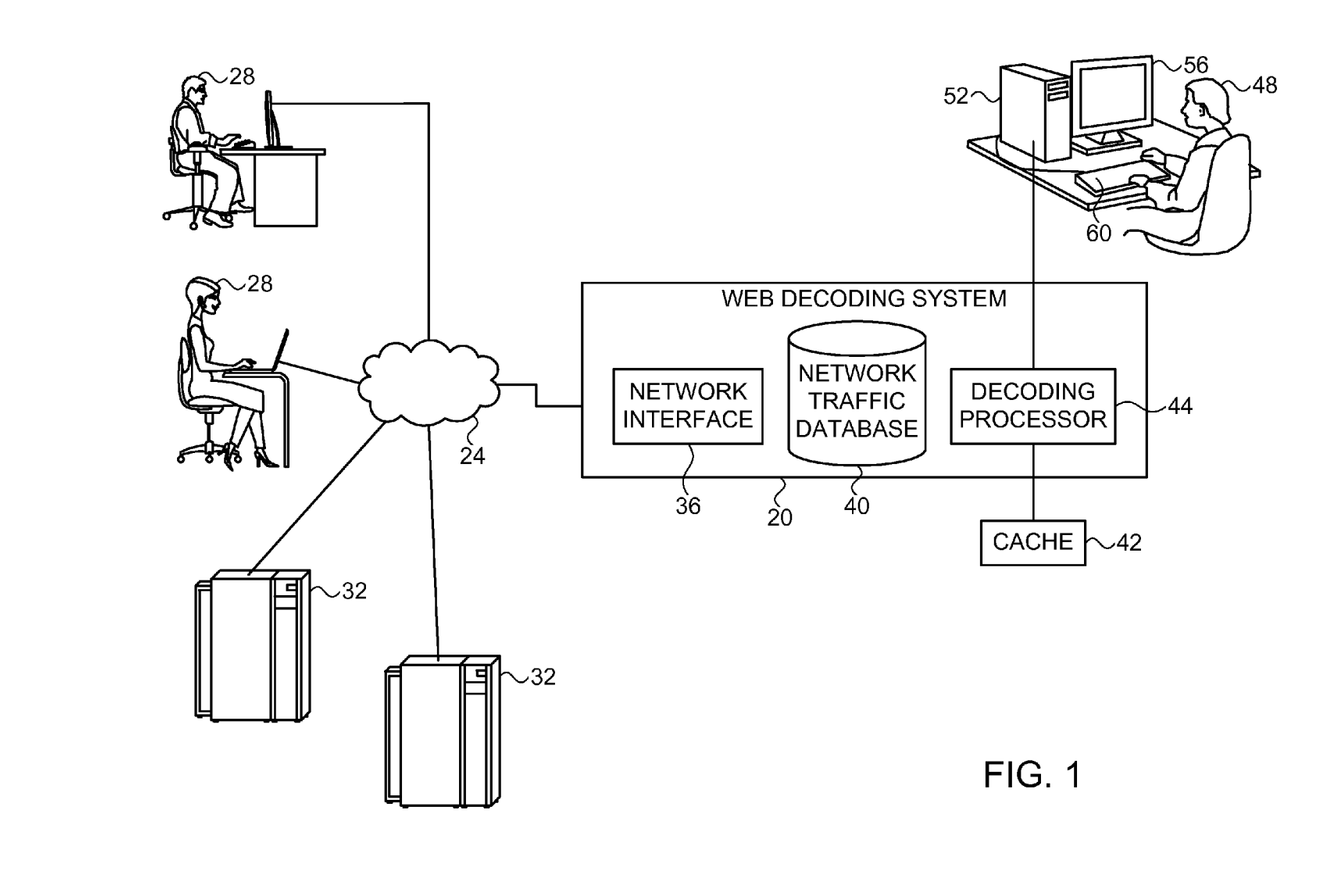
FIG. 1 is a block diagram that schematically illustrates a system for web decoding, in accordance with an embodiment of the present disclosure.

FIG. 1 is a block diagram that schematically illustrates a system 20 for web decoding, in accordance with an embodiment of the present disclosure. System 20 accepts communication packets from a computer network 24, in which users 28 conduct network sessions. Web decoding system 20 processes the packets so as to reconstruct and present network sessions conducted by certain users 28 regarded as targets.

Network 24 may comprise the Internet, an Intranet of a certain organization or any other corporate or general network.

Generally, users 28 use a browser to access web sites, hosted by one or more servers 32. As is known, the browser may be used for many different tasks, including retrieving and displaying text, graphics and media (e.g., audio or video), exchanging emails, conducting messaging, voice and video sessions, downloading and other communication activities.

Messages and data exchanged between users 28 and servers 32 may be governed by a web-browsing protocol, such as Hyper-Text Transfer Protocol (HTTP). Web pages provided to users 28 are optionally governed by a web page protocol, such as HTML or XHTML, although pages of other formats may also be provided and displayed.

In the example of FIG. 1, system 20 comprises a network interface 36, a traffic database 40 and a decoding processor 44. Network interface 36 receives the packets from network 24, extracts their content of interest, e.g., the requested URLs and the corresponding files supplied for the requested URLs, and stores the packet contents in database 40 for analysis. Alternatively, interface 36 may store the packets themselves, the extraction being performed at a later stage. In some embodiments, database 40 stores content of packets that are associated with certain target users. Typically, the content from each packet is stored with a time stamp, which indicates the reception time of the packet. In some embodiments, the stored content is indexed by various keys, for subsequent quick access. The indexing keys include, for example, the identity of the target user, the time stamp and a full Uniform Resource Locator (URL) indicating a data element on a server to which the message relates. When more than one packet includes portions of a same data element, the content of the packets is optionally combined into a single "packet content" unit, for simplicity of handling. For simplicity of the following description, the term packet is used herein to refer also to "packet content", those parts of the packet that were stored for further use.

Decoding processor 44 retrieves packets from database 40 and uses the packets to reconstruct network sessions of target users. The packets are typically arranged in database 40 separately per user 28, for example according to their IP address, so that processor 44 is able to access the packets associated with a given target user. The reconstructed sessions are presented to an operator, e.g., an analyst or investigator, on a display 56 of an operator terminal 52. The operator may manipulate the displayed session or otherwise provide input to system 20 using input devices 60, such as a keyboard or mouse.

A cache 42 is used in some embodiments to store data elements which may be used at a later time. Processor 44 may store in cache 42 all elements identified in traffic database 40, for a predetermined interval, for example a week or a month, or may store only specific types of elements, such as static elements. In some embodiments, processor 44 stores in cache 42 those elements having an indication in their header that they should be cached.

In some embodiments, processor 44 determines the type of browser used by the target user, for example based on finding a browser parameter in the traffic in database 40, and accordingly uses the known caching methods of that specific type of browser in determining which elements are stored in cache 42. Alternatively, processor 44 begins handling each new target user by storing all elements in cache 42. Processor 44 then determines which elements are stored by the target user's cache by identifying their absence from the traffic in database 40 and accordingly determines the caching rules of the browser of the target user. Optionally, processor 44 is configured with known caching rules of different browsers and these rules are compared to the URLs whose elements were cached and URLs of elements not cached to determine which rules were used, and accordingly the browser of the user.

The system configuration of FIG. 1 is an example configuration, which is shown purely for the sake of conceptual clarity. In alternative embodiments, any other suitable system configuration can also be used. For example, the functions of decoding processor 44 may be partitioned among multiple servers or other computing platforms. As another example, the functions of decoding processor 44 may be carried out by a switching element (e.g., network switch) of network 24.

Decoding Processor

Figure 2:
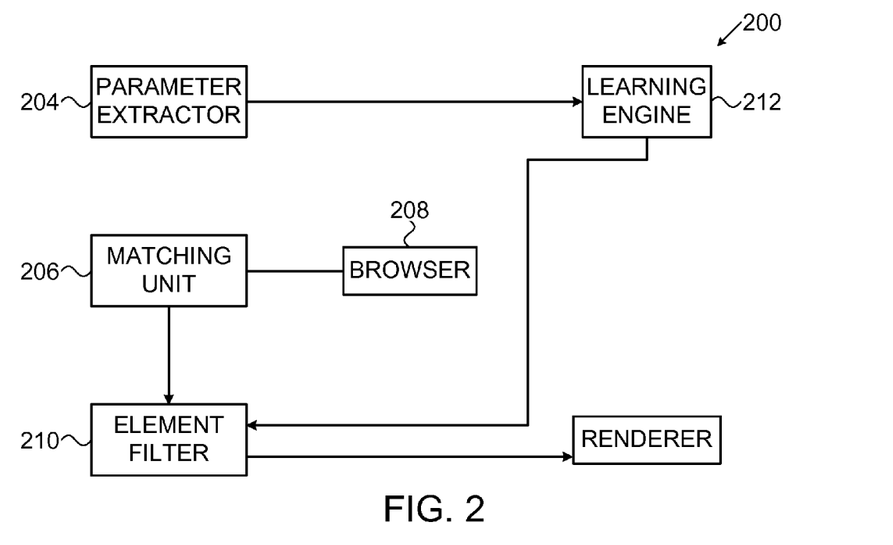
FIG. 2 is a block diagram of software elements running on a decoding processor, in accordance with an embodiment.

FIG. 2 is a block diagram of software elements 200 running on decoding processor 44, in accordance with an embodiment of the disclosure. Software elements 200 optionally include a parameter extractor 204 which prepares, for data elements, respective records including various parameters of the data elements. A matching unit 206 optionally determines for main page data elements, which other data elements in database 40 originate from being embedded within a web page represented by the data element. In some embodiments of the disclosure, matching unit 206 transfers the main page data element to a browser 208 which in attempting to render the web page represented by the main page data element, generates requests for the embedded data elements it needs. Matching unit 206 searches database 40 for data elements corresponding to the generated requests, marks the corresponding data elements as being embedded in a different element and connects the main data element to the corresponding data elements.

An element filter 210 optionally scans the data elements in database 40 to determine which are sufficiently important to be displayed on their own on operator terminal 52 and which should not be displayed on their own.

In some embodiments, a learning engine 212 adjusts the filtering parameters of element filter 210 during operation, based on input from an operator 48.

A renderer 216 optionally reconstructs the web pages corresponding to data elements determined to be displayed to the operator 48, possibly using browser 208.

Matching Unit

In some embodiments, matching unit 206 considers a requested data element as matching a corresponding data element in database 40 only if they have exactly the same URL. Alternatively, in addition to matching elements having the same address, matching unit 206 attempts to match also elements having similar URLs, for example using the following method described with reference to FIG. 3.

Figure 3:
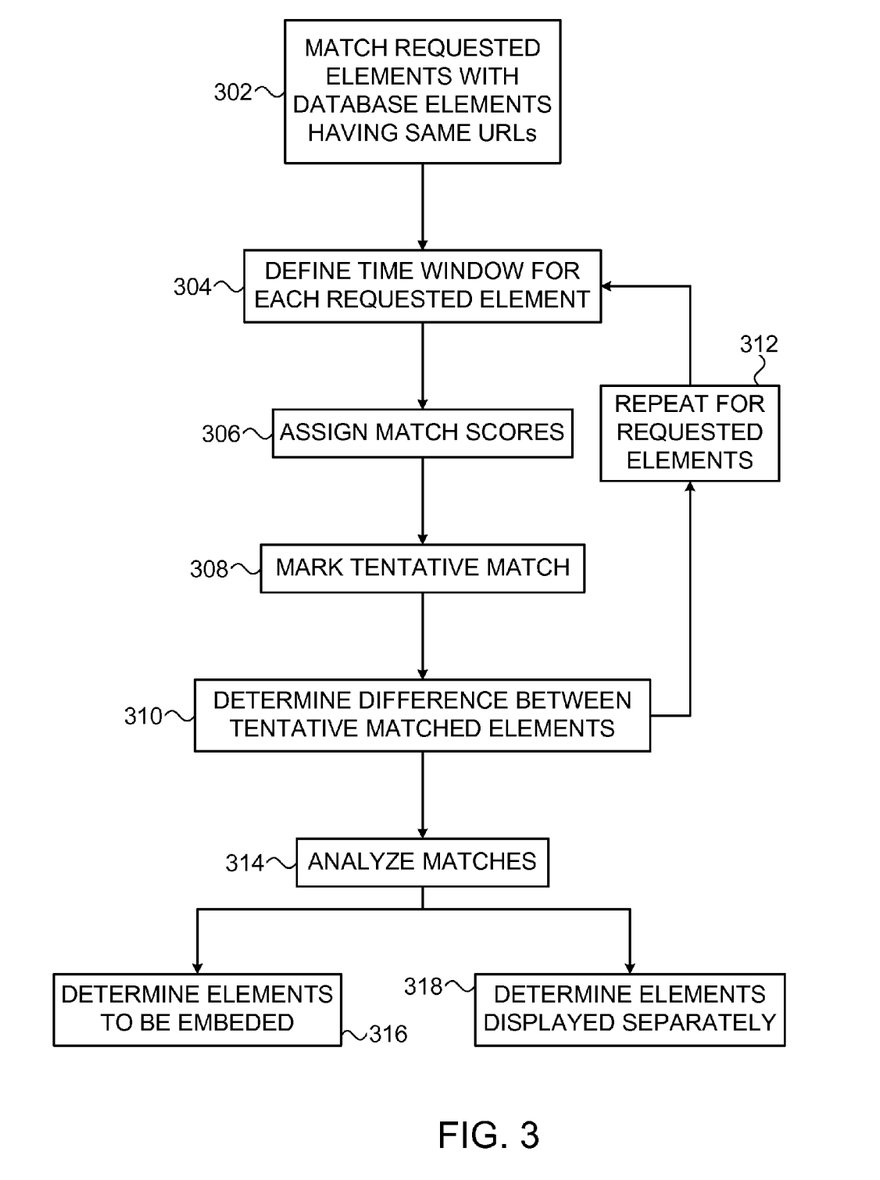
FIG. 3 is a flowchart of acts performed by a matching unit, in accordance with an embodiment of the present disclosure.

FIG. 3 is a flowchart of acts performed by matching unit 206, in accordance with an embodiment of the disclosure. After matching (302) requested elements and corresponding elements in database 40 having same URLs, matching unit 206 optionally defines (304), for each requested element, a time window in which embedded elements for the main-page element requesting the element could have reasonably been received. The URLs of the elements in database 40 in the time window are optionally compared to the URL of the requested element, and matching scores are assigned (306) to each of the data elements in the time window. The requested element having a highest matching score is optionally marked (308) as a tentative match and the difference between the requested element and tentative match element is determined (310). This process is optionally repeated (312) for many or even all the requested elements. The tentative matches are then analyzed (314) to determine whether (316) each one should be displayed by renderer 216 embedded in the web page of the corresponding request. Alternatively or additionally, element filter 210 determines whether (318) the matching elements should be displayed separately, at least partially based on the score of the match.

The time window is optionally defined (304) as beginning at the reception time stamp of the main page requesting the requested element, as elements received before the main page data element could not have been requested by the main page data element, which itself was received only after they were requested. The time window is optionally of a length in which requested embedded elements are normally ordered and received, for example, between 30-50 seconds, although longer or shorter windows may be used.

The URL comparison optionally includes comparing the sub-fields of the URLs and determining the number of sub-fields and/or the number of characters that are different. Optionally, different types of differences are given different weight. Matching unit 206 may manage a list of templates of known differences which occur and differences which match such templates are given lower weight. The templates may include for example, sub-fields which are commonly used to indicate random numbers, time and/or client computer attributes (e.g., screen resolution, operating system, browser version). The list of templates optionally includes a score to be given to differences meeting the template, the scores optionally depending on the likelihood that the difference although matching the template is not due to the reason behind the template. For example, a mismatch between the sub-fields "rand=56789" and "rand=12345" is expected to represent a meaningless difference merely due to use of different random numbers, more than a difference between the sub-fields "r=56789" and "r=12345". Strings of the form (Num)×(Num), such as 1280×800, would generally be recognized as screen size parameters.

In some embodiments of the disclosure, the same considerations are used in determining whether (316) a tentative match element is displayed by renderer 216 embedded in the web page for which the corresponding request was generated and whether (318) the matching elements should be displayed separately. That is, in these embodiments, tentative match elements not embedded in a different web page are displayed on their own. In other embodiments, different considerations are used in determining whether a tentative match element should be embedded in a different page and whether it should be displayed on its own. Optionally, some tentative match elements are not displayed at all. For example, a first, relatively low score threshold, may be used to determine that a tentative match element is probably not a main page and therefore should not be displayed on its own, while a second, higher, threshold is used to determine whether the tentative match element is to be embedded in a specific web page.

The analysis (314) of the tentative matches optionally includes finding trends for a plurality of URLs from a single domain. Following the finding of such a trend, the scores of the tentative matches fitting the trend are optionally increased. Alternatively or additionally, the fitting to the trend is taken into account in deciding whether to embed the tentative matches in their respective main pages and/or whether the tentative matches should be displayed on their own.

Finding a trend optionally includes identifying a plurality of tentative matches whose differences relative to their corresponding requests are the same or similar. The number of tentative matches having similar or same changes required to determine the existence of a trend is optionally selected as a sufficient number to conclude that the trend is not a coincidence. In an exemplary embodiment, a trend requires at least 5, at least 10 or at least 20 tentative matches with the same trend. Optionally, the tentative matches required to determine the existence of a trend are required to include at least a predetermined percentage of the tentative matches. In some embodiments, different trends have a different effect on the scores of the tentative matches fitting the trend, according to the confidence level of the existence of the trend.

Alternatively or additionally to finding trends, the match analysis (314) includes finding differences that match known difference reasons. For example, the difference may be examined to determine if it hints that the difference is due to a time difference between the transaction and the operation time of matching unit 206. Similarly, known difference causes may include parameters of the web access environment of the target user, such as the screen resolution and/or the type and/or version of the browser used. Optionally, the known differences include random values. The reasons of the differences may be determined using a list of templates of known differences, as discussed hereinabove.

Instead of finding elements in database 40 matching requested elements, the matching may be performed in the opposite direction, finding for elements in database 40 matching requested elements.

In some embodiments, instead of generating only a single list of requested elements, matching unit 206 submits the main page to browser 208 a plurality of times possibly in different modes (e.g., emulating different browsers, for example various versions of Internet Explorer, Firefox and/or Chrome) and/or the main page is submitted to a plurality of different browsers. Each submission of the main page to a browser 208 results with a list of requested elements. Matching unit 206 optionally matches the elements of the different lists to each other, and finds for each element the differences between the URLs of the elements for different submissions. The differences between the URLs of corresponding requested elements of different lists are used to determine corresponding elements in database 40 and/or to assign a confidence score to tentative matches.

In some embodiments, in addition to searching for matches for requested elements in database 40, processor 44 searches for matches in cache 42. Optionally, cache 42 is searched only for items for which a match is not found in database 40. Alternatively, a best match is searched for in both database and cache 42 and if the best match in cache 42 is a substantially better match than the match in database 40, it is used rather than the match in database 40.

Element Filter

In some embodiments, element filter 210 manages a plurality of templates which are typical of embedded elements that should not be displayed on their own as a main page. Element filter 210 compares the parameters of each element to the templates and marks those elements that match at least one of the templates as not to be displayed.

The templates optionally include:
a) elements having a non-OK response code
b) elements that match a requested embedded element of a different main page element
c) elements that are listed in their header as coming from a referrer
d) elements having a non-HTML content
e) elements having an AJAX header
f) elements having neither a title nor a meta-link
g) elements having more than one meta-link
h) elements having a URL in a list of known ad servers It is noted that in some embodiments, element filter 210 may use more complex templates relating to a plurality of parameters. For example, as some elements from ad servers and some elements indicated in their header as coming from a referrer may be of interest, the templates relating to these parameters may require another condition for being marked as not for display, such as having a small size and/or having a small number of links to embedded elements or no embedded elements at all. In accordance with another complex template example, elements having no embedded links to other elements are considered not-for-display, provided they do not relate to update or download of a file. Upload of data is optionally identified by the method of request being "post" and the request itself having a body. Download elements are optionally identified as having a protocol other than HTTP. A further example template identifies elements in which the user posts data, excluding automatically created posts which are not of interest.

Feedback

In some embodiments of the disclosure, the web pages are displayed on display 56 of operator terminal 52 along with a request for feedback as to whether the displayed web page is a main web page which should be displayed separately or is an unimportant element (e.g., an embedded data element) which should not be displayed separately. Optionally, each displayed web page is displayed along with a request for feedback. Alternatively, only web pages for which processor 44 has a confidence level that they are a main web page which should be displayed separately, below a predetermined threshold (e.g., 100% or 95%) are displayed with a request for feedback. Further alternatively or additionally, a request for feedback is displayed only during a startup training period and/or during periodic training periods. In some embodiments, when processor 44 identifies that the percentage of data elements for which it does not know if they are embedded pages or main pages with sufficient confidence increases by a given percent and/or beyond a predetermined level it moves into a training period. Similarly, processor 44 may terminate a training period after a predetermined time and/or when the number and/or percentage of elements for which it does not know, with sufficient confidence whether they are embedded pages or main pages decreases sufficiently. Optionally, the user may request to begin and/or end a training period.

Optionally, when a request for feedback is displayed, the user is required to provide feedback, possibly not being able to proceed unless feedback is provided. Alternatively, the user is free to decide whether to provide feedback. In some embodiments, in some cases, for example during a startup training period, the user is required to provide feedback, while during other periods the user is not required to provide feedback. Alternatively, the user is required to provide feedback only for specific data elements for which processor 44 determines that the feedback is important. Optionally, processor 44 requests feedback for elements that have one or more parameter values which appear both in main pages and in embedded pages. In some embodiments, processor 44 requests feedback for elements that have parameter values that are usually embedded elements, but for which there is a significant percentage (e.g., above 5%, above 10%) of elements that are main pages. Optionally, feedback is requested for small elements (e.g., smaller than 1 Kbyte), flash elements, elements involving posting of data from the browser to the server and elements that include a relatively small number of links to embedded pages, or otherwise their number of embedded pages is characteristic of both main pages and embedded pages.

In some embodiments of the disclosure, each data element is displayed as a single web page on the entire screen of display 56. Alternatively, a plurality (e.g., at least 4, at least 8 or even at least 12) of data elements may be displayed side by side, concurrently. In some embodiments, in some or all of the training periods and/or for some types of data elements requiring feedback, more data elements are displayed concurrently on display 56, than when feedback is not required. This allows the user to provide feedback faster. Displaying a large number of data elements concurrently may be used, for example, for data elements having a relatively low confidence level that they are a main page, while a smaller number of data elements (or even only a single data element) are displayed concurrently, for elements with a high confidence that they are main pages.

The request for feedback is optionally provided in the form of feedback buttons or other controls which the user actuates using input devices 60.

While in the above description the feedback is provided by the user explicitly, in some embodiments system 20 uses implicit feedback. For example, data elements viewed by the user for more than a predetermined time may be considered important and data elements viewed for only a short period may be considered unimportant. In some embodiments, implicit feedback may be used only for some data elements, for example for data elements for which it is believed that a quick glance is sufficient to determine whether they are important or not. For example, implicit feedback may be collected for data elements having a relatively small data size (e.g., less than 500K, less than 200K, or even less than 100K). Optionally, a plurality of data elements are displayed concurrently and data elements for which the operator did not request enlargement are considered unimportant.

Parameter Extraction

The feedback received for each data element is optionally stored along with the parameter values collected by parameter extractor 204. Parameter extractor 204 optionally extracts for each data element values of a plurality of parameters. The parameters optionally include the fields of the URL and the fields of the HTTP header, such as browser type and/or version. Optionally, for data elements having an HTML body, the extracted parameters include the tags of the HTML body. In some embodiments, the parameters further include whether the URL has a portion of a random form. The random form may be identified, for example, based on knowledge of the known randomization algorithms used by most computers.

Optionally, one or more parameters are not based on the content of the data element. In some embodiments, one or more of the parameters depend on the relative transmission times of the data element and related data elements, such as other data elements from the same domain and/or other data elements transmitted to the same target user. Such parameters may include, for example, the time duration since a previous related data element was received, the time duration until a next related data element is received and/or the number of related data elements received within a time window around the reception of the current data element.

In some embodiments of the disclosure, one or more parameters depend on statistics rather than on the content itself. For example, one or more parameters may depend on the frequencies of the different byte values in the body of the data element. Optionally, one of the parameter includes the byte value most frequent in the body of the data element.

Template Construction

Learning engine 212 optionally periodically uses the stored information to define templates of data elements not to be displayed as main pages. Optionally, learning engine 212 searches for values of subsets of parameters that appear only in data elements that the user has marked as non-main-page data elements. In some embodiments, the trends are required to relate to at least a predetermined number of parameters, for example at least 5 or even at least 10.

In some embodiments, learning engine 212 identifies parameter values for which at least a first predetermined number of negative feedback and a second predetermined number of positive feedback was received from the user. Optionally, learning engine 212 searches for parameter values that can be used to differentiate between the data elements of the positive and negative feedback.

Alternatively or additionally to learning engine 212 searching for templates, learning engine 212 operates an artificial intelligence engine, such as a decision tree, a linear regression module, a genetic algorithm module and/or a neural network, which is used in filtering pages which are not to be displayed separately.

The use of learning engine 212 is especially useful in adjusting the operation of system 20 to local environments and/or to the conventions of web-sites used by specific target users.

CONCLUSION

System 20 may be used for various applications, including, for example, network forensic, employee training, data leakage prevention (DLP), Internet activity monitoring and tool testing. The disclosed techniques are particularly effective in reconstructing sessions that involve Web 2.0 applications.

Typically, processor 44 in FIG. 1 comprises a general-purpose processor, which is programmed in software to carry out the functions described herein. The software may be downloaded to the computers in electronic form, over a network, for example, or it may, alternatively or additionally, be provided and/or stored on tangible media, such as magnetic, optical, or electronic memory.

The methods and systems described herein can be carried out in real-time or off-line. In off-line operation, the information in database 40 is static, and the target user session is reconstructed from this static information. In real-time operation, packets continue to flow from network 24 during reconstruction of the target user session. In this mode of operation, the system displays data elements of a session of a target user, while the session is still in progress, at a certain delay.

It will be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication analysis, comprising the steps of:

by a decoding processor, intercepting data communication packets exchanged over a computer network during at least one web browsing session associated with a target user;

by the decoding processor, processing the packets so as to identify data elements viewed by the target user during the web browsing session;

by the decoding processor, determining for a specific identified data element, URLs of a plurality of data elements requested by the specific data element for embedding therein;

by the decoding processor, matching the URLs of the requested data elements to respective identified data elements, at least some of the matches performed although the URLs are not identical, wherein matching the URLs of the requested data elements to respective identified data elements comprises finding for each requested data element an identified data element having a most similar URL within a respective time window and determining whether the difference between the URLs of the requested data element and the most similar identified data element follow a known difference trend; and by the decoding processor, determining the further handling of the matched identified element responsive to the matching.

2. The method according to claim 1, wherein determining the URLs of embedded elements of the specific data element comprises providing the data element to a browser and collecting the requests generated by the browser, responsive to the specific data element.

* * * * *